(12) United States Patent
Naruse

(10) Patent No.: US 6,778,765 B2
(45) Date of Patent: Aug. 17, 2004

(54) CAMERA AND TRANSPORT APPARATUS

(75) Inventor: Mutsumi Naruse, Saitama (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/265,256

(22) Filed: Oct. 7, 2002

(65) Prior Publication Data

US 2003/0152377 A1 Aug. 14, 2003

(30) Foreign Application Priority Data

Feb. 8, 2002 (JP) ........................................ 2002-031991

(51) Int. Cl.⁷ .............................................. G03B 17/50
(52) U.S. Cl. ........................................ 396/33; 396/40
(58) Field of Search ............................ 396/30, 33, 40; 399/75, 167, 303, 313

(56) References Cited

U.S. PATENT DOCUMENTS 5,619,292 A * 4/1997 Matsuzaki et al. ............ 396/32
6,009,277 A * 12/1999 Norris ........................... 396/33
6,337,950 B2 * 1/2002 Sasaki ........................... 396/33

FOREIGN PATENT DOCUMENTS

JP 01298335 A * 12/1989 .......... G03B/17/52
JP 11-316412 11/1999

* cited by examiner

Primary Examiner—David M. Gray
(74) Attorney, Agent, or Firm—Young & Thompson

(57) ABSTRACT

The present invention provides a camera which restrains a photosensitized material from being unstably discharged, while allowing a reduction in diameter of a pair of rollers that feed the photosensitized material out of the camera as well as a transport apparatus which restrains a transported material from being unstably discharged, while allowing a reduction in diameter of a pair of rollers that feed the transported material out of the camera. According to the present invention, an increase in interval between each roller gear fixed to a corresponding one of a pair of rollers and a corresponding one of two roller driving gears meshing with the respective roller gears is suppressed compared to an increase in interval between the roller gears, fixed to the respective rollers.

6 Claims, 5 Drawing Sheets

CAMERA AND TRANSPORT APPARATUS

BACKGROUND OF THE INVENTION

1. Field of the Invention

The present invention relates to a camera that feeds a photographed photosensitized material out thereof by sandwiching it between a pair of rollers, and a transport apparatus that transports a sheet-like or web-like transported material by sandwiching it between a pair of rollers.

2. Description of the Related Art

Instant cameras have been known into which stacked sheet-like instant photograph films are loaded and which takes a photograph on the loaded instant photograph film and feeds the photographed instant photograph film out of the camera by sandwiching the film between a pair of revolving rollers.

FIG. 1 is a diagram showing a part of a vertical section of such an instant camera.

FIG. 1 shows a camera enclosure 11 of an instant camera 1, an instant film pack 14 that allows a plurality of stacked unexposed instant photograph films 12 to be loaded inside the instant camera 1, a film discharge port 15 through which a photographed instant photograph film is discharged out of the instant camera, and a pair of revolving rollers 3 and 13 driven to feed an exposed instant photograph film to the film discharge port 15.

In FIG. 1, the right surface of each unexposed instant photograph film 12 in the instant film pack is an exposed surface, whereas the left surface thereof is an image formed surface on which an image appears. A developer pod 12a in which developer is sealed is disposed at a position of each unexposed instant photograph film 12 which corresponds to the upper side of FIG. 1. A trap 12b in which excess developer is collected is disposed at a position of each unexposed instant photograph film 12 which corresponds to the lower side of FIG. 1.

FIG. 2 is a diagram showing a rotation mechanism for the pair of revolving rollers shown in FIG. 1.

FIG. 2 shows a pair of revolving rollers 3 and 13, gears 31 and 131 each coaxially fixed to a corresponding one of the pair of revolving rollers and meshing with each other, and a reduction gear 20 meshing with a gear 131 coaxially fixed to the revolving roller 13.

The gear 131 meshes not only with the reduction gear 20 but also with the gear 31, so that drive force of a motor (not shown) is transmitted to the gear 131 via the reduction gear 20 to rotate the revolving roller 13 (shown closer to the reader in FIG. 2), to which the gear 131 is fixed. The drive force is also transmitted to the gear 31, which meshes with the gear 131, to rotate the revolving roller 3 (shown further from the reader in FIG. 2), to which the gear 31 is fixed. The revolving roller 3, shown further from the reader in FIG. 2, is forced by a spring (not shown) in a direction in which it is pressed against the revolving roller 13, shown closer to the reader in FIG. 2. A photographed instant photograph film is fed out of the camera against the force.

When a photograph is taken using the instant camera 1, photographing light from the right of FIG. 1 impinges on the exposed surface of the instant photograph film. The photographed instant photograph film is drawn up from the instant film pack 14 using a claw (not shown). The drawn-up film is fed out of the camera by sandwiching it between the revolving rollers. In this case, the developer pod 12a, provided for the instant photograph film 12, is pressed by the revolving rollers and torn and opened. The photographed instant photographic film is developed by developer flowing out from the torn and opened developer pod 12a. Further, the previously described trap 12b contains an absorbent (not shown) that absorbs excess developer and that is difficult to crush. Thus, the trap 12b constitutes a thicker part of the instant photograph film.

In order to meet the recent demand for a reduction in size of portable equipment, it is contemplated that the size of the camera main body is reduced by reducing the diameter of the revolving rollers to omit the resulting unwanted space.

However, when the diameter of the revolving rollers is reduced, the interval between the axes of the revolving rollers decreases. This forces a reduction in diameter of the gears coaxially fixed to the respective revolving rollers and meshing with each other. Accordingly, the height of the gear teeth must be reduced owing to their durability and the like, causing the gears to mesh with each other shallowly. Then, if a thicker part of the instant photograph film such as the trap thereof is fed out of the camera and the interval between the revolving rollers is increased compared to the case where another part of the film is fed out, the gears meshing with the respective revolving rollers may be unmeshed to cause the film to be unstably fed out. The above described phenomenon may occur even if the transported material, transported while being sandwiched between the pair of rollers, is not a instant photograph film, provided that the transported material does not have a fixed thickness.

SUMMARY OF THE INVENTION

In view of these circumstances, it is an object of the present invention to provide a camera which restrains a photosensitized material from being unstably discharged, while allowing a reduction in diameter of a pair of rollers that feed the photosensitized material out of the camera as well as a transport apparatus which restrains a transported material from being unstably discharged, while allowing a reduction in diameter of a pair of rollers that feed the transported material out of the camera.

To attain the above object, the present invention provides a camera into which photosensitized materials are loaded therein and which takes a photograph on the loaded photosensitized material and feeds the photographed photosensitized material out of the camera, the camera being characterized by comprising:

a pair of rollers that feeds the photographed photosensitized material out of the camera by sandwiching the photosensitized material therebetween, one of the rollers being forced in a direction in which the roller comes into contact with the other;

a drive source that exerts drive force on the pair of rollers;

two roller gears each coaxially fixed to a corresponding one of two rollers constituting the pair of rollers;

two roller driving gears each of which meshes with a corresponding one of the two roller gears and which mesh with each other, each of the roller driving gears transmitting the drive force of the drive source to the roller gear meshing therewith; and a drive force transmitting gear that meshes with one of the two roller driving gears to transmit the drive force of the drive source to the roller driving gear meshing therewith.

According to the camera of the present invention, the above configuration suppresses an increase in interval between each of the roller gears, fixed to the corresponding one of the pair of rollers, and the corresponding one of the roller driving gears, which mesh with the respective roller gears, compared to an increase in interval between the roller gears, the increases caused by the passage of a thicker part of the photosensitized material. This increases the possibility of transmitting drive force of the drive source to each of the pair of rollers compared to the prior art. Therefore, according to the camera of the present invention, the photosensitized material is restrained from being unstably discharged, while allowing the diameter of the pair of rollers to be reduced.

In this case, the photosensitized material may be a sheet-like instant photograph film, and the camera may be an instant camera into which stacked sheet-like instant photograph films are loaded and which takes a photograph on the loaded photosensitized material and feeds the photographed photosensitized material out of the camera by sandwiching the photosensitized material between the pair of rollers.

When the camera of the present invention is an instant camera, a part of the instant photographic film called a "trap" can be effectively transported outward from the camera, the trap absorbing excess developer in the film and being thicker than the other parts thereof.

Further, the drive source is preferably a motor.

Thus, the invention is easily embodied.

To attain the above object, the present invention provides a transport apparatus that transports a sheet-like or web-like transported material, the apparatus characterized by comprising:

a pair of rollers that transport the transported material by sandwiching the transported material therebetween, one of the rollers being forced in a direction in which the roller comes into contact with the other;

a drive source that exerts drive force on the pair of rollers;

two roller gears each coaxially fixed to a corresponding one of two rollers constituting the pair of rollers;

two roller driving gears each of which meshes with a corresponding one of the two roller gears and which mesh with each other, each of the roller driving gears transmitting the drive force of the drive source to the roller gear meshing therewith; and a drive force transmitting gear that meshes with one of the two roller driving gears to transmit the drive force of the drive source to the roller driving gear meshing therewith.

According to the transport apparatus of the present invention, the above configuration suppresses an increase in interval between each of the roller gears, fixed to the corresponding one of the pair of rollers, and the corresponding one of the roller driving gears, which mesh with the respective roller gears, compared to an increase in interval between the roller gears, the increases caused by the passage of a thicker part of the transported material. This increases the possibility of transmitting drive force of the drive source to each of the pair of rollers compared to the prior art. Therefore, according to the transport apparatus of the present invention, the transported material is restrained from being unstably discharged, while allowing the diameter of the pair of rollers to be reduced.

DETAILED DESCRIPTION OF THE PREFERRED EMBODIMENTS

An embodiment of the present invention will be described below.

Figure 1:
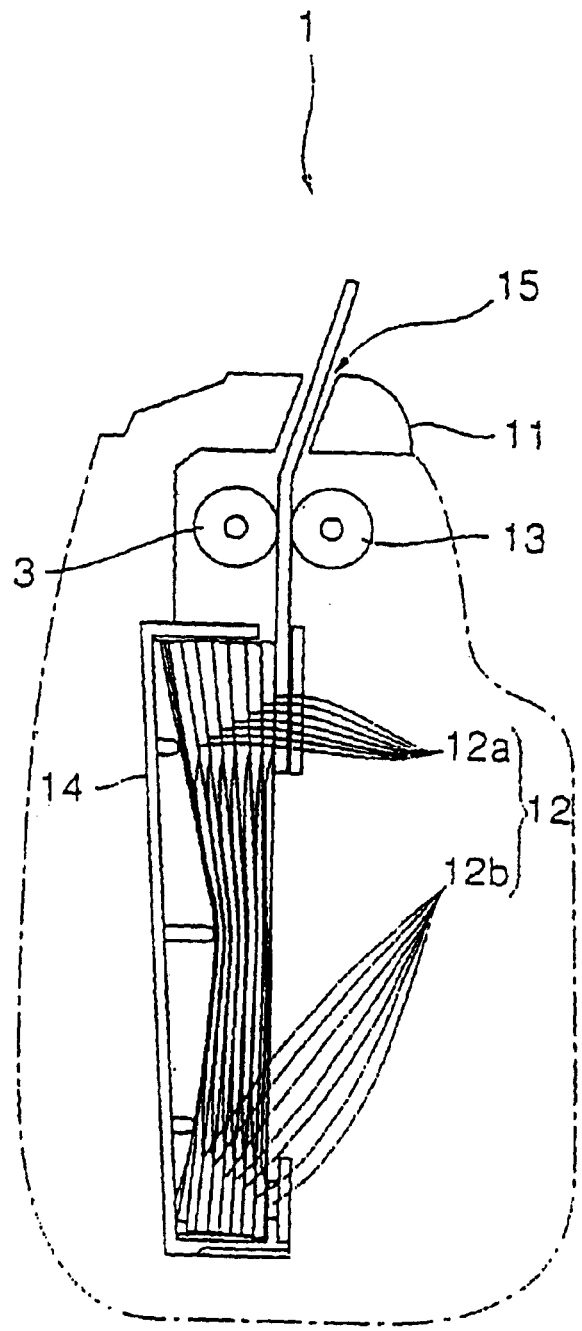
FIG. 1 is a diagram showing a part of a vertical cross section of a conventional instant camera.
Figure 2:
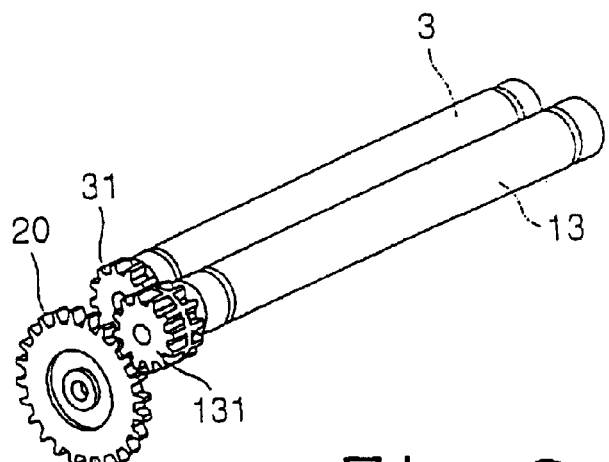
FIG. 2 is a diagram showing a part of a rotation mechanism for a pair of revolving rollers, shown in FIG. 1.
Figure 3:
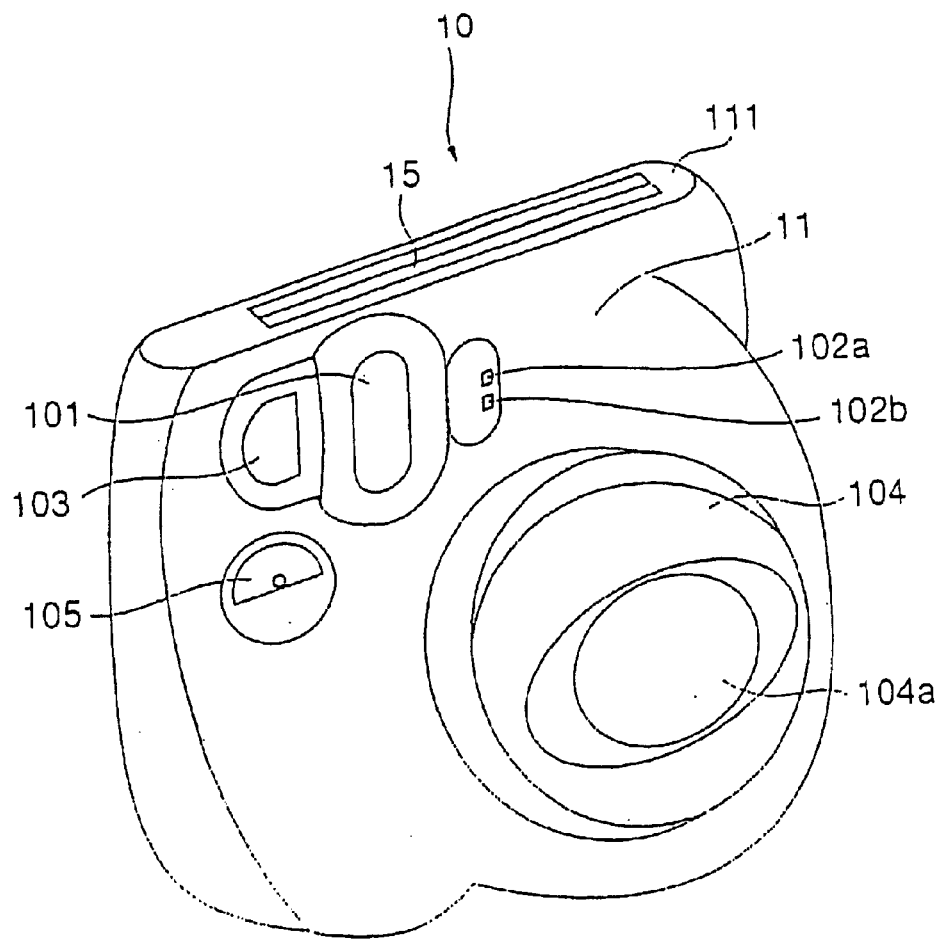
FIG. 3 is a perspective view of an embodiment of an instant camera according to the present invention as viewed diagonally from above.

FIG. 3 is a perspective view of an embodiment of a camera according to the present invention as viewed diagonally from above. This embodiment includes an embodiment of a transport apparatus of the present invention. Those components in FIG. 3 which are of the same types as the corresponding components in FIG. 1 are denoted by the same reference numerals as those in FIG. 1. Further, in an instant camera 10 of this embodiment, a pair of revolving rollers (see FIG. 4) provided to feed a photographed instant photograph film out of the camera have their diameter reduced compared to the conventional revolving rollers shown in FIGS. 1 and 2.

The instant camera 10, shown in FIG. 3 is relatively compact; an instant film pack 14 with instant photograph films stacked therein is loaded in the instant camera 10, and a photograph is taken on the instant photograph film in the instant film pack.

The instant photograph film used in the instant camera 10 is a monosheet type film unit treated as one sheet from its unexposed state until an image is formed thereon; the film has its photosensitive surface exposed to photographing light and is then discharged out from the camera, and during the discharge, a developer pod in the film is crushed and the developer is unfolded into a predetermined layer in the film for development. The instant photograph film is also a transparent film unit having an exposed surface and a separate image formed surface.

Further, the instant camera 10, shown in FIG. 3, is composed of a camera enclosure 11 and a camera main body provided inside the camera enclosure 11. A cylindrical lens barrel 104 is provided in the center of a front surface of the camera enclosure 11 and has its position relative to the camera main body changed when the instant camera 10 is used. The lens barrel 104 has a fixed focus type photographing lens 104a fitted therein.

FIG. 3 shows that the lens barrel 104 has been moved to a collapsed position before use. In the instant camera 10, the lens barrel 104 is manually withdrawn from the collapsed position to an extended position (not shown), which is used during operation.

The camera enclosure 11 has a release button 105 arranged in the right (in the FIG. 3, the left) of the front surface thereof. The release button 105 is depressed to expose the instant photograph film to photographing light. Further, a protector 101 arranged on a front surface of a flash device (not shown) is arranged obliquely above the release button 105. A flash light receiving window 102a is arranged to the left (in FIG. 3, the right) of the protector 101 to guide flash light to a light receiving element (not shown) that receives a quantity of flash light reflected by an object during flash light emission. A light receiving window 102b is provided below the flash light receiving window 102a to measure the luminance of the object. Further, the instant camera 10 is equipped with a reverse Galilean finder and has a finder objective window 103 arranged adjacent to the protector. Although not shown, the camera enclosure 11 of the instant camera 10 has a finder ocular window (not shown) arranged on a rear surface thereof.

The camera enclosure 11 has a film discharge port 15 formed in a top surface 111 thereof and through which the photographed instant photograph film is discharged out from the camera.

Figure 4:
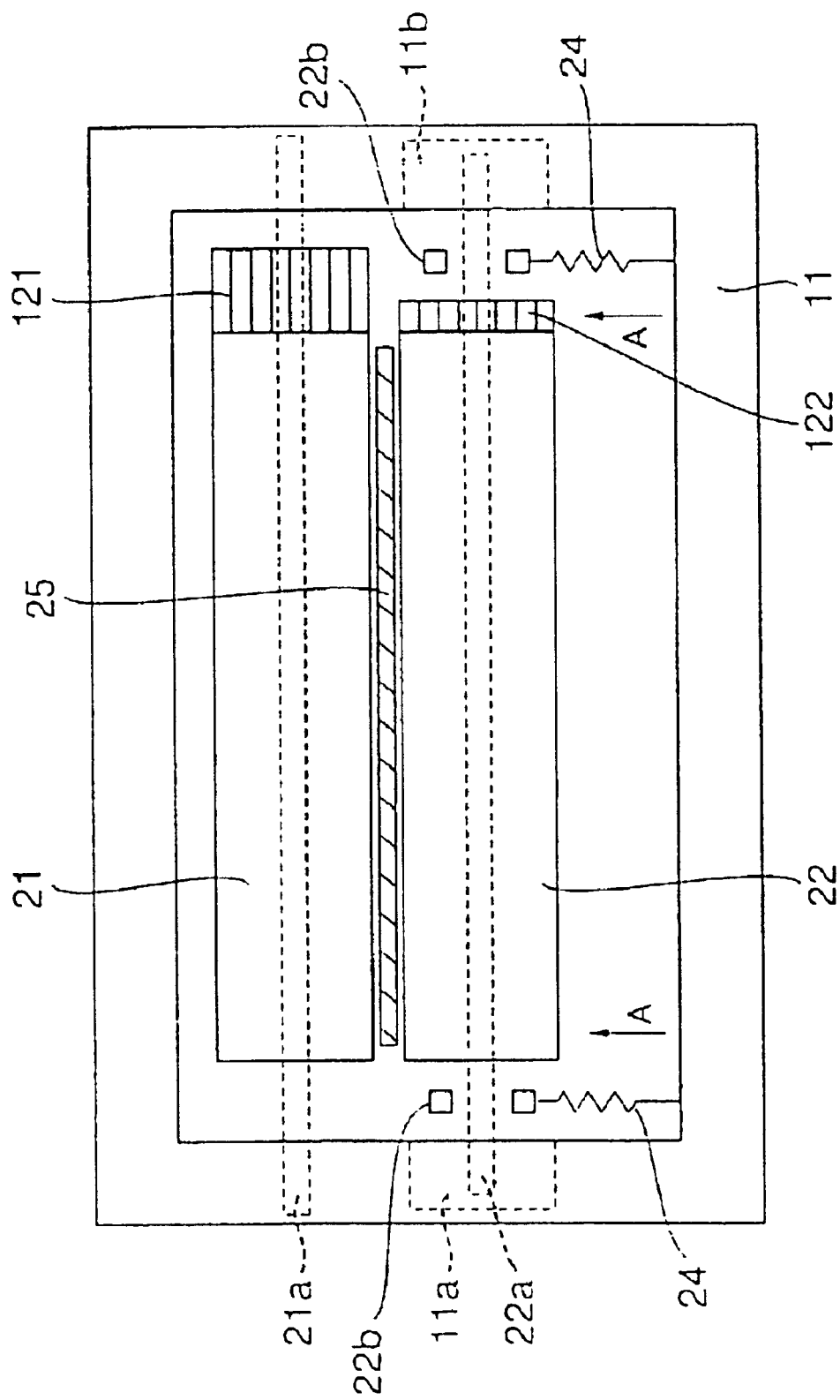
FIG. 4 is a perspective view of the instant camera shown in FIG. 3.

FIG. 4 is a perspective view of the instant camera shown in FIG. 3.

FIG. 4 shows a pair of revolving rollers 21 and 22 provided in the instant camera 10 and also shows that shafts 21a and 22a inserted centrally into the pair of revolving rollers 21 and 22, respectively, each have its opposite ends supported by the camera enclosure 11.

Of the pair of revolving rollers shown in FIG. 4, a first revolving roller 21 located in the front (in FIG. 4, the left) of the camera has a first gear 121 joined to a right end (in FIG. 4, the top) thereof and meshing with a first driving gear 221 (see FIG. 5), described later in detail.

On the other hand, a second revolving roller 22 located in the rear (in FIG. 4, the right) of the camera has a second gear 122 joined to a right end thereof and meshing with a second driving gear 222 (see FIG. 5), described later in detail.

The camera enclosure has a portion 11a drilled in slot form to support a shaft 22a of the second revolving roller 22 and through which the shaft 22a can be moved in the longitudinal direction of the camera. Furthermore, a shaft supporting member 22b is inserted through the neighborhood of each of the opposite ends of the shaft 22a of the second revolving roller 22 to support the shaft 22a separately from camera enclosure 11. These shaft supporting members 22b each have a spring 24 attached thereto to force the shaft 22a toward the front of the camera (the direction of arrow A). Since the spring 24 forces the shaft 22a of the second revolving roller 22 toward the front of the camera, the second revolving roller 22 is pressed against the first revolving roller 21 and can be moved in the longitudinal direction of the camera over a distance corresponding to the thickness of an exposed instant photograph film 25 passing between the revolving rollers, the thickness varying with each portion of instant photograph film 25.

Figure 5:
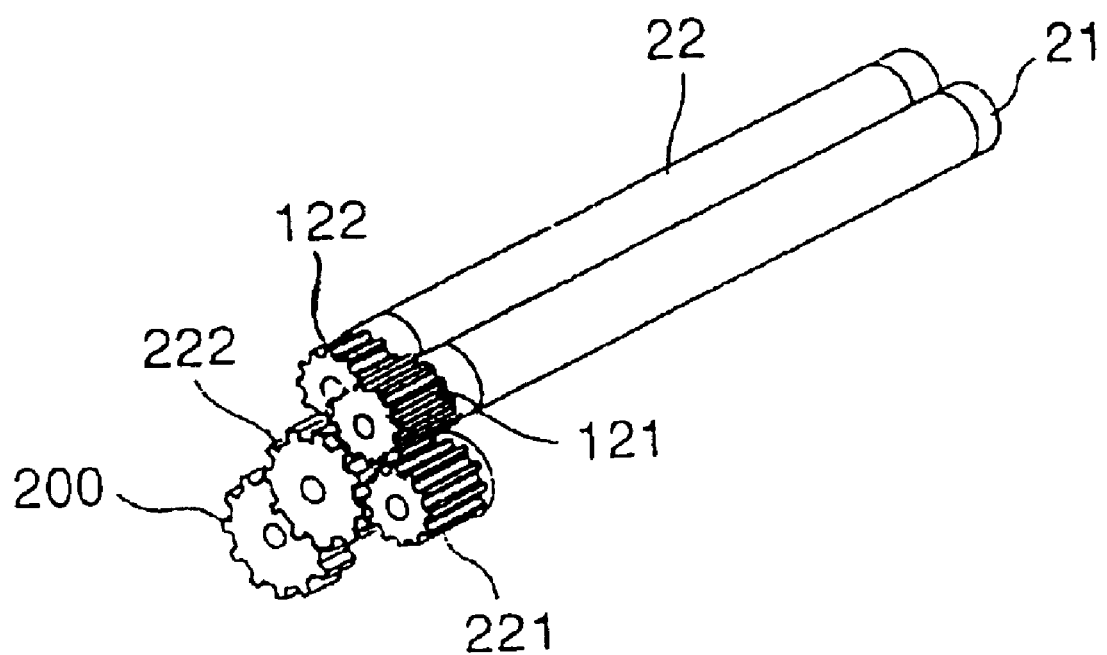
FIG. 5 is a perspective view of a rotation mechanism for revolving rollers of the instant camera of this embodiment as viewed diagonally from the front.

FIG. 5 is a perspective view of a rotation mechanism for the revolving rollers of the instant camera of this embodiment as viewed diagonally from the front.

FIG. 5 shows the rotation mechanism for the revolving rollers as transparently viewed diagonally from the right front of the instant camera 10. This figure shows the first revolving roller 21 and second revolving roller 22, i.e. the pair of revolving rollers also shown in FIG. 4, a first gear 121 and a second gear 122 fixed to the respective revolving rollers, a first driving gear 221 and a second driving gear 222 meshing with the first and second driving gears 121 and 122, respectively, and meshing with each other, and a reduction gear 200 that transmits drive force from a motor to a second driving gear 222 so as to reduce the rotation speed of the second driving gear 222, the second driving gear 222 meshing with the reduction gear 200. As shown in FIG. 4, in the instant camera 10, the first gear 121 and the roller 21 have substantially the same diameter, and the second gear 122 and the roller 22 also have substantially the same diameter. Further, in this embodiment, even while no film is being fed, the first gear 121 does not mesh with the second gear 122.

Figure 6A:
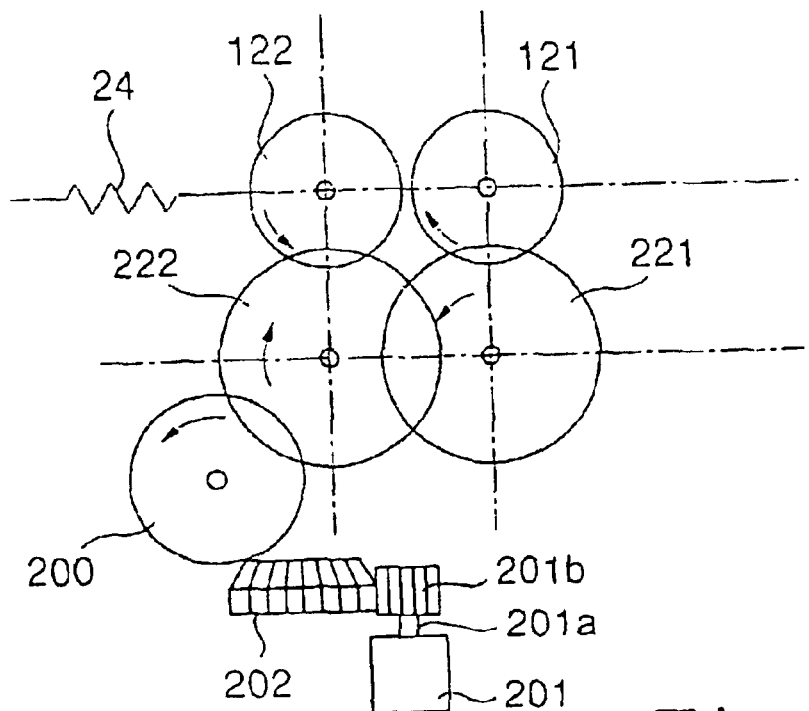
FIGS. 6A and 6B are schematic views of the rotation mechanism for the revolving rollers of the instant camera of this embodiment as viewed from a right side of the rotation mechanism.
Figure 6B:
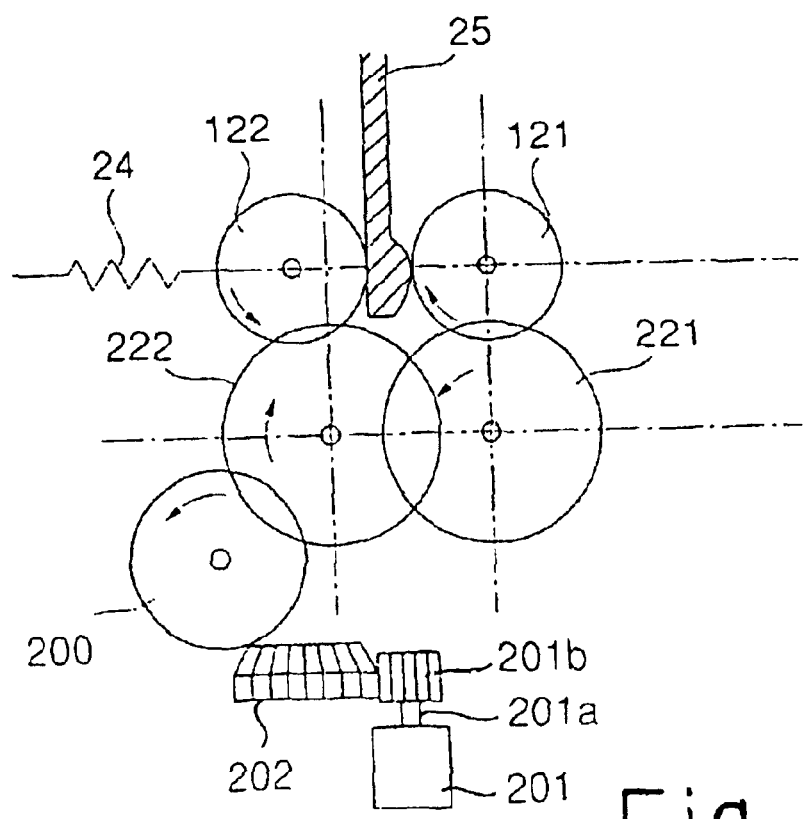

FIGS. 6A and 6B are schematic views of the rotation mechanism for the revolving rollers of the instant camera of this embodiment as viewed from a right side of the rotation mechanism.

FIG. 6A schematically shows the rotation mechanism at the time when no instant photograph film has been fed out of the camera. FIG. 6B schematically shows the rotation mechanism at the time when an instant photograph film is being fed out of the camera.

FIGS. 6A and 6B each show the second gear 122 in the upper left, the first gear 121 in the upper right, the second driving gear 222 in the middle left, the first driving gear 221 in the middle right, and the reduction gear 200 at the bottom, with the spring 24 attached to the second gear 122 in the upper left.

FIGS. 6A and 6B each also show a motor 201, a pinion 201b, and a transmission gear 202 below the reduction gear 200, shown at the bottom, the pinion 201b being embedded in a rotating shaft 201a of the motor, the transmission gear 202 transmitting the drive force of the motor 201 to the reduction gear 200. For the convenience of description, the drive force of the motor 201 is shown transmitted to the reduction gear 200 only via the transmission gear 202. However, the transmission is actually carried out using a gear train composed of a plurality of gears.

In the instant camera 10 of this embodiment, the drive force of the motor 201 is transmitted to the second driving gear 222, shown in the middle left in FIG. 6A or 6B, via the pinion 201b, the transmission gear 202, and the reduction gear 200. The drive force transmitted to the second driving gear 222 is transmitted to the second gear 122 in the upper left and to the first driving gear 221 in the middle right. The drive force transmitted to the first driving gear 221 is further transmitted to the first gear 121 in the upper right.

Then, FIG. 6A is compared with FIG. 6B. An increase in interval between the second gear 122 and the second driving gear 222 is smaller than an increase in interval between the second gear 122 and the first gear 121, the increases being caused by feeding of the instant photograph film.

Consequently, the instant camera 10 of this embodiment enables an increase in possibility of transmitting the drive force of the motor to each of the pair of revolving rollers compared to the prior art. This restrains the instant photograph film from being unstably discharged as a result of the reduced diameter of the pair of revolving rollers.

Further, in the instant camera 10 of this embodiment, the first gear, the second gear, the first driving gear, and the second driving gear are rotated in the direction shown by the arrows shown in FIGS. 6A and 6B. Furthermore, the second gear 122 with the spring 24 attached thereto is forced toward the first gear 121 also by rotation of the second driving gear 222. The use of this force allows employment of a spring that exerts resilient force weaker than that exerted in the prior art.

In the example described above for the camera of the present invention, an instant camera that directly exposes a photosensitized material to object light has been described as an embodiment. However, the present invention is not limited to this aspect, but the camera of the present invention may be of a type that captures an object image as image data and then exposes the photosensitized material to light.

In the example described above, the transport apparatus of the present invention is integrated into the instant camera. However, the transport apparatus of the present invention may be integrated into, instead of the camera, a printer which uses a laser to write an image on an instant photograph film and which then transports the film. Alternatively, the transport apparatus may be constructed separately from an image writing apparatus but linked thereto for use.

Further, the transported material transported by the printer or transport apparatus may be, instead of a sheet-like instant photograph film, such instant photograph films continuously connected together so as to form a web. Furthermore, the transported material is not limited to a photosensitized material but may be such a web-like member with thicker portions as causes the interval between the two gears 121 and 122 to be increased as shown in FIG. 6B.

What is claimed is:

1. A camera into which photosensitized materials are loaded therein and which takes a photograph on the loaded photosensitized material and feeds the photographed photosensitized material out of the camera, the camera comprising:

a pair of rollers that feeds the photographed photosensitized material out of the camera by sandwiching the photosensitized material therebetween, one of the rollers being forced in a direction in which the roller comes into contact with the other;

a drive source that exerts drive force on said pair of rollers;

two roller gears each coaxially fixed to a corresponding one of two rollers constituting said pair of rollers;

two roller driving gears each of which meshes directly with a corresponding one of said two roller gears and which mesh directly with each other, each of the roller driving gears transmitting the drive force of said drive source to the roller gear meshing therewith; and a drive force transmitting gear that meshes with one of said two roller driving gears to transmit the drive force of said drive source to the roller driving gear meshing therewith;

wherein the roller gears are arranged so that there exists a plane perpendicular to the axes of rotation of the roller gears that passes through both of the roller gears.

2. The camera according to claim 1, wherein said photosensitized material is a sheet-like instant photograph film, and the camera is an instant camera into which stacked sheet-like instant photograph films are loaded and which takes a photograph on the loaded instant photograph film and feeds the photographed instant photograph film out of the camera by sandwiching the instant photograph film between the pair of rollers.

3. The camera according to claim 1, wherein said drive source is a motor.

4. The camera of claim 1, wherein the roller driving gears, which are directly meshed with one another and each of which is directly meshed with a respective one of the two roller gears, are arranged so that there exists a plane perpendicular to the axes of rotation of the roller driving gears that passes through both of the roller driving gears.

5. A transport apparatus that transports a sheet-like or web-like transported material, the apparatus comprising:

a pair of rollers that transport the transported material by sandwiching the transported material therebetween, one of the rollers being forced in a direction in which the roller comes into contact with the other;

a drive source that exerts drive force on said pair of rollers;

two roller gears each coaxially fixed to a corresponding one of two rollers constituting said pair of rollers;

two roller driving gears each of which meshes directly with a corresponding one of said two roller gears and which mesh directly with each other, each of the roller driving gears transmitting the drive force of said drive source to the roller gear meshing therewith; and a drive force transmitting gear that meshes with one of said two roller driving gears to transmit the drive force of said drive source to the roller driving gear meshing therewith;

wherein the roller gears are arranged so that there exists a plane perpendicular to the axes of rotation of the roller gears that passes through both of the roller gears.

6. The transport apparatus of claim 5, wherein the roller driving gears, which are directly meshed with one another and each of which is directly meshed with a respective one of the two roller gears, are arranged so that there exists a plane perpendicular to the axes of rotation of the roller driving gears that passes through both of the roller driving gears.

* * * * *